(12) United States Patent
Foss et al.

(10) Patent No.: US 8,744,889 B1
(45) Date of Patent: Jun. 3, 2014

(54) COST BASED EMPLOYEE SCHEDULING

(75) Inventors: Lucinda Kathryn Foss, San Francisco, CA (US); Charles Shieh, Cupertino, CA (US)

(73) Assignee: Intuit Inc., Mountain View, CA (US)

( * ) Notice: Subject to any disclaimer, the term of this patent is extended or adjusted under 35 U.S.C. 154(b) by 965 days.

(21) Appl. No.: 12/210,059

(22) Filed: Sep. 12, 2008

(51) Int. Cl.
*G06Q 10/00* (2012.01)
*G06Q 10/06* (2012.01)

(52) U.S. Cl.
CPC ..................................... *G06Q 10/06* (2013.01)
USPC ..................... 705/7.13; 705/7.12; 705/7.16

(58) Field of Classification Search
CPC ......................... G06Q 10/06; G06Q 10/06311
USPC .......................................................... 705/7.13
See application file for complete search history.

(56) References Cited

U.S. PATENT DOCUMENTS

| | | | |
|---|---|---|---|
| 6,334,133 B1 * | 12/2001 | Thompson et al. | 1/1 |
| 6,347,306 B1 * | 2/2002 | Swart | 705/32 |
| 7,478,051 B2 * | 1/2009 | Nourbakhsh et al. | 705/7.37 |
| 2004/0010437 A1 * | 1/2004 | Kiran et al. | 705/8 |
| 2004/0078257 A1 * | 4/2004 | Schweitzer et al. | 705/9 |
| 2004/0243428 A1 * | 12/2004 | Black et al. | 705/1 |
| 2005/0177407 A1 * | 8/2005 | Barni | 705/8 |
| 2007/0021982 A1 * | 1/2007 | Sun | 705/2 |
| 2007/0179830 A1 * | 8/2007 | Iknoian | 705/9 |
| 2008/0046305 A1 * | 2/2008 | Garcia et al. | 705/9 |
| 2008/0319822 A1 * | 12/2008 | LaJoie et al. | 705/9 |

OTHER PUBLICATIONS

Glover, Fred and McMillan, Claude. The General Employee Scheduling Problem: An Integration of MS and AI. Computer & Operations Research. vol. 13, No. 5, pp. 563-573. 1986.*
What is Physician Scheduler?, PhysicianScheduler.com, AtStaff, Inc., 2005, 2 pages.
Let Excel Calendar 50 People to Shifts 1.53, SOFT32.com, ITNT 2008, 2 pages.

* cited by examiner

*Primary Examiner* — Johnna Loftis
(74) *Attorney, Agent, or Firm* — Osha Liang LLP

(57) ABSTRACT

A method for managing a shift schedule, involving obtaining employee data for employees, a payroll constraint for a time period, and an employer requirement for the shift schedule, and collecting an employee availability schedule from each employee. The method further involves generating shift schedules based on the payroll constraint, employee data, employer requirement, and employee availability schedules, determining a payroll budget associated with each shift schedule, ranking the shift schedules based on the payroll budget to obtain a ranked list of shift schedules, and presenting the ranked list of shift schedules to an employer.

21 Claims, 4 Drawing Sheets

COST BASED EMPLOYEE SCHEDULING

BACKGROUND

Retailers and restaurants frequently hire part-time employees. Creating a schedule that works well for everyone on staff can be both challenging and time consuming. Even after a schedule is completed, employees often trade schedules, which adds additional complexity and in some cases results in unexpected costs to the business owner. Techniques have been developed for automating aspects of assignment scheduling processes. For example, spreadsheet-based scheduling tools have been devised for the routine scheduling tasks. In addition, products offered by AtStaff, Inc. of Durham, N.C., USA (e.g., www.physicianscheduler.com) attempts to provide assignment scheduling capability taking into account fairness, coverage requirement, personnel conflicts, staff requests, and workload limits.

SUMMARY

In general, in one aspect, the invention relates to a method for managing a shift schedule. The method involves obtaining employee data for a plurality of employees, a payroll constraint for a time period, an employer requirement for the shift schedule, collecting a plurality of employee availability schedules from the plurality of employees, and generating the plurality of shift schedules based on the payroll constraint, the employee data, the employer requirement, and the plurality of employee availability schedules. The method further involves determining a payroll budget associated with each of the plurality of shift schedules, ranking the plurality of shift schedules based on the payroll budget to obtain a ranked list of shift schedules, and presenting the ranked list of shift schedules to an employer.

In general, in one aspect, the invention relates to a computer readable medium storing a plurality of instructions for managing a shift schedule. The plurality of instructions comprise functionality for obtaining employee data for a plurality of employees, a payroll constraint for a time period, an employer requirement for the shift schedule, collecting a plurality of employee availability schedules from the plurality of employees, and generating the plurality of shift schedules based on the payroll constraint, the employee data, the employer requirement, and the plurality of employee availability schedules. The plurality of instructions further comprise functionality for determining a payroll budget associated with each of the plurality of shift schedules, ranking the plurality of shift schedules based on the payroll budget to obtain a ranked list of shift schedules, and presenting the ranked list of shift schedules to an employer.

In general, in one aspect, the invention relates to a system for managing a shift schedule. The system includes a processor, memory comprising a plurality of instructions executed by the processor, wherein the plurality of instructions are configured to receive a change request to the approved shift schedule from a first employee of the plurality of employees, revise, responsive to the change request, the approved schedule to generate a proposed revised schedule based on a second employee substituting for the first employee, wherein the second employee is identified from the plurality of employees based on the plurality of shift schedules, and wherein the second employee has a pay rate to minimize a change in the payroll budget, request approval of the proposed revised schedule by the employer, and present the proposed revised schedule to the plurality of employees based on approval from the employer.

Other aspects of the invention will be apparent from the following description and the appended claims.

DETAILED DESCRIPTION

Figure 1A:
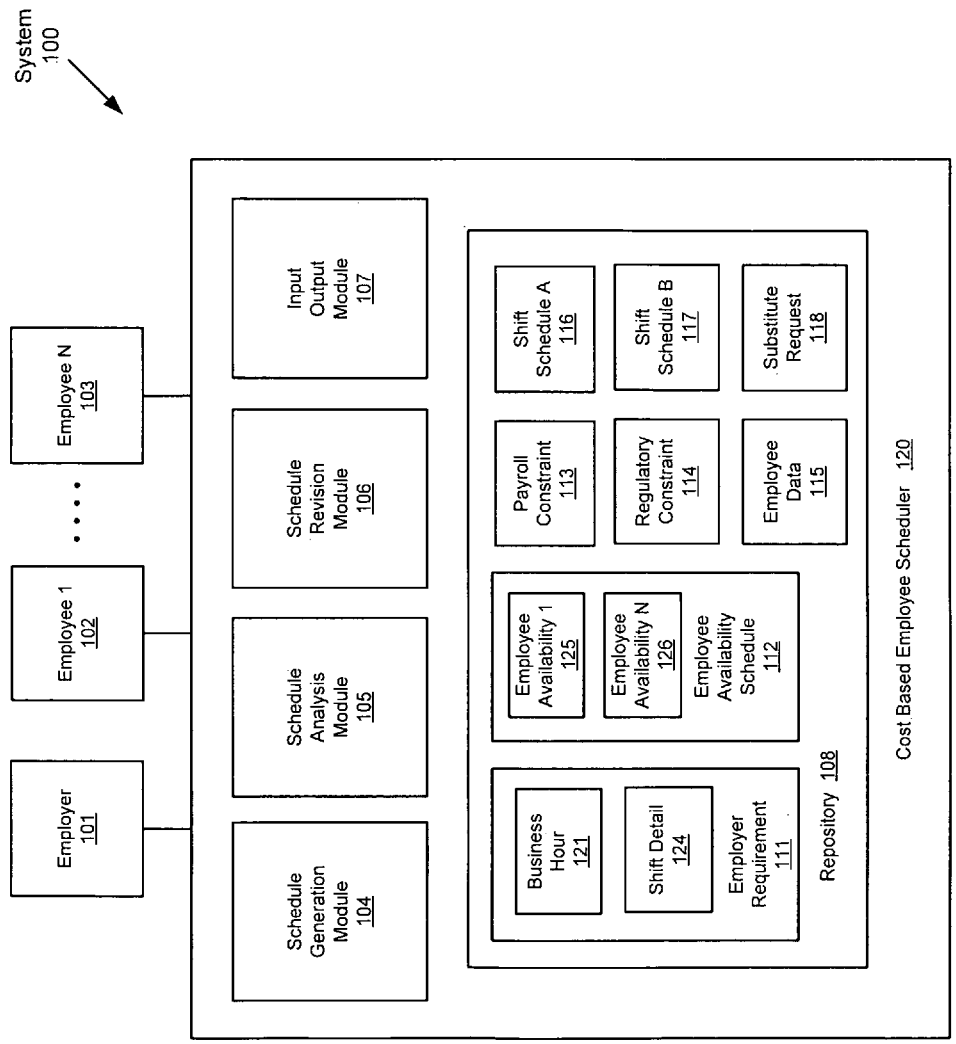
FIG. 1A depicts a schematic block diagram of a system in accordance with one or more embodiments of the invention.

Specific embodiments of the invention will now be described in detail with reference to the accompanying Figures. Like elements in the various Figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method to automate employee scheduling process based on cost consideration of the employer.

FIG. 1A depicts a schematic block diagram of a system (100) in accordance with one or more embodiments of the invention. The system (100) includes employer (101), employee 1 (102), employee N (103), and cost based employee scheduler (120). Although only two employees (i.e., employee 1 (102) and employee N (103)) are shown in FIG. 1A, those skilled in the art will recognize that any number of employees may be included in the system (100) without deviating from the spirit of the invention. As shown in FIG. 1A, the cost based employee scheduler (120) includes schedule generation module (104), schedule analysis module (105), schedule revision module (106), input output module (107), and repository (108). In addition, the repository (108) further includes employer requirement (111), employee availability schedule (112), payroll constraint (113), regulatory constraint (114), employee data (115), shift schedule A (116), shift schedule B (117), and substitute request (118).

In one or more embodiment of the invention, the employer (101) may be a business, a business owner, or an entity or individual having a need to generate an employee schedule. Generally speaking, the employer (101) may have access to a number of employees (e.g., employee 1 (102), employee N (103), etc.) under pre-established agreements and governed by certain regulatory requirements. In addition, the business associated with the employer (101) may operate under payroll budget guidelines to achieve certain workload output goals where the payroll budget and workload output goals are operating parameters characteristic of the business.

In one or more embodiment of the invention, employee 1 (102) and employee N (103) are workers compensated (or paid) based on the amount of time (e.g., number of hours) they work for the employer (101) during a time period (i.e., pay period) and are generally covered under the Fair Labor Standards Act (FLSA) in the United States. Typically, the working hours during the time period are organized into shifts where each shift is associated with pre-determined start/end time and duration on a periodic basis.

In one or more embodiment of the invention, the cost based employee scheduler (120) is a networked system (e.g., an Internet web-based system) configured to generate shift schedules (e.g., shift schedule A (116), shift schedule B (117), etc.) based on requirements from the employer (101) (e.g., employer requirement (111)), availability of the employees (e.g., employee availability schedule (112)), and employee details relating to pre-established agreements and performance assessment (e.g., employee data (115)) while satisfying various constraints imposed by the business operating parameters (e.g., payroll constraint (113)), government regulations (e.g., regulatory constraint (114)), or other applicable constraints. In such embodiments, the cost based employee scheduler (120) may be accessed via a network (e.g., Internet, not shown) by employer (101), employee 1 (102), or employee N (103) using any computing device (not shown) known in the art. In one or more embodiment of the invention, the cost based employee scheduler (120) is configured to generate multiple shift schedules with varying cost/workload output characteristics for review and approval by the employer (101). In one or more embodiment of the invention, the cost based employee scheduler (120) is further configured with functionalities to revise an approved shift schedule in response to changes requested from any of the employees (e.g., substitute request (118)) and evaluate the cost impacts from such changes.

Figure 1B:
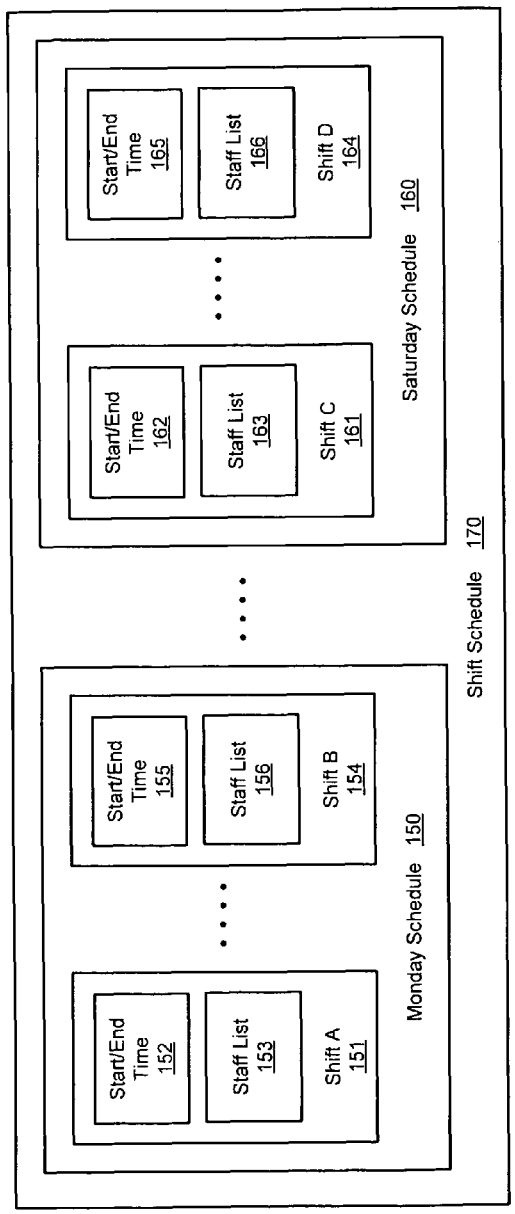
FIGS. 1B-1C depict more details of the schematic block diagram of FIG. 1A in accordance with one or more embodiments of the invention.

In general, the time span of a shift schedule typically coincides with one or more pay periods but may also be defined differently. More details of shift schedule A (116) or shift schedule B (117) are shown as shift schedule (170) in FIG. 1B. As shown in FIG. 1B, the shift schedule (170) includes daily schedules such as Monday schedule (150) and Saturday schedule (160). Although only two daily schedules are shown in FIG. 1B, those skilled in the art will appreciate that there may be any number or type of schedules in the shift schedule (170) without deviating from the spirit of the invention. In other words, the two daily schedules shown in shift schedule (170) may be substituted by any number of daily schedules, weekly schedules, monthly schedules, or other appropriate schedules representing groupings of shifts staffed by employees. Further, as shown in FIG. 1B, each schedule (e.g., Monday schedule (150), Saturday schedule (160), etc.) of the shift schedule (170) includes multiple shifts such as shift A (151), shift B (154), shift C (161), shift D (164), etc. In addition, each of these shifts further includes start/end time of employee working hours (e.g., start/end time (152), (155), (162), and (165)) and list of employees (e.g., staff list (153), (156), (163), and (166)) working during particular hours of the shift.

Figure 1C:
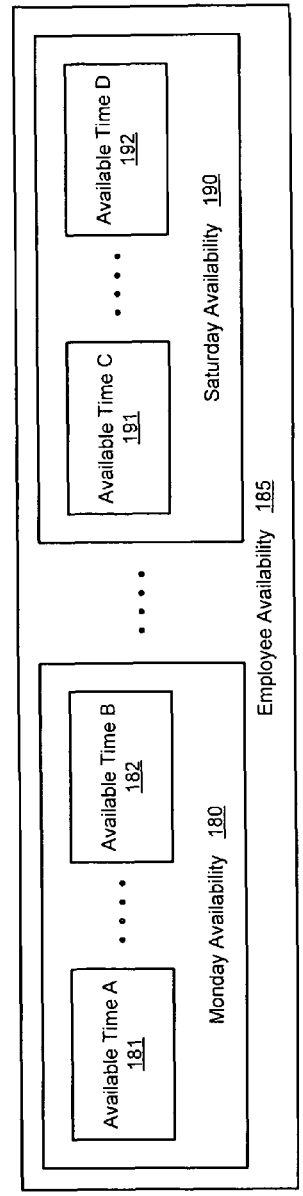

In one or more embodiment of the invention, the employee availability schedule (112) includes multiple availability schedules for each individual employee (e.g., employee availability 1 (125) and employee availability N (126)). More details of the employee availability 1 (125) or the employee availability N (126)) are shown as employee availability (185) in FIG. 1C. As shown in FIG. 1C, the employee availability (185) includes daily availabilities such as Monday availability (180) and Saturday availability (190). Although only two daily availabilities are shown in FIG. 1C, those skilled in the art will appreciate that there may be any number or type of availabilities in the employee availability (185) without deviating from the spirit of the invention. In other words, the two daily availabilities shown in employee availability (185) may be substituted by any number of daily, weekly, monthly, or other appropriate availabilities representing groupings of available time of employees. Further as shown in FIG. 1C, each instance of the employee availability (185) (e.g., Monday availability (180), Saturday availability (190), etc.) includes multiple available time periods such as available time A (181), available time B (182), available time C (191), available time D (192), etc.

Although the shift schedule (170) and employee availability (185) are shown in specific formats in FIGS. 1B-1C, those skilled in the art will appreciate that other formats may be used for the shift schedule (170) or employee availability (185) without deviating from the spirit of the invention.

In one or more embodiment of the invention, the employer requirement (111) includes business hour (121) and shift detail (124), which specify one or more periodic time spans covered by shifts to operate the business as well as specifics of each shift such as number of employees working at each shift, shift length consideration, hours per week per employee, and/or other criteria relevant to the employer (101). In one or more embodiment of the invention, the number of employees working at each shift specified in the shift detail (124) may be based on employees with average performance grade while the actual number of employees assigned to a particular shift may be adjusted based on the actual performance grade of the assigned employees. For example, an experienced employee or two entry level employees may produce the same workload output therefore can be alternatively assigned to a shift to meet the same employer requirement (111).

In one or more embodiment of the invention, the payroll constraint (113) may include payroll budget that can not be exceeded for a shift schedule to be valid or can not be exceeded without approval from the employer (101). The payroll budget may be a fixed amount for each pay period covered by the shift schedule or may vary (e.g., seasonally, adjusted for special events, increasing with inflation, etc.) throughout the shift schedule.

In one or more embodiment of the invention, the regulatory constraint (114) may include maximum shift lengths, maximum hours per week per employee, minimum wages, etc. as required by federal, state, local governments, trade association, or other regulating bodies having authority over the business.

In one or more embodiment of the invention, the employee data (115) may include pay rate (or wage), benefit status, experience level, performance grade, or other information relevant for assigning an employee to the shift schedule.

In one or more embodiment of the invention, the schedule generation module (104) organizes the working hours of the employees from the employee availability schedule (112) into a number of shifts in a shift schedule based on a pre-determined algorithm to meet the employer requirement (111). In one or more embodiment of the invention, the pre-determined algorithm may be a constraint driven algorithm, which is capable to generate multiple alternative shift schedules (e.g., shift schedule A (116) and shift schedule B (117)) meeting the payroll constraint (113) and the regulatory constraint (114). In one or more embodiment of the invention, the schedule analysis module (106) analyses employee related expense based on pay rate, overtime, number of employees per shift, etc. to generate a cost based ranking of these multiple alternative shift schedules.

In one or more embodiment of the invention, the pre-determined algorithm used by the schedule generation module (104) may be a cost driven algorithm, which is capable to generate multiple alternative shift schedules (e.g., shift schedule A (116) and shift schedule B (117)) with minimum employee related expenses (thus meeting the payroll constraint (113)) disregard of the regulatory constraint (114). In one or more embodiment of the invention, the schedule analysis module (106) analyses violations with respect to the regulatory constraint (114) and eliminate invalid shift schedules from these multiple alternative shift schedules.

In one or more embodiment of the invention, the schedule generation module (104) and the schedule analysis module (105) may be integrated as one module to execute a unified constraint driven and cost optimizing algorithm and generate multiple cost ranked shift schedules (e.g., shift schedule A (116) and shift schedule B (117)) based on a correct-by-construction approach.

Accordingly, these multiple cost ranked shift schedules are presented to the employer (101) for review and approval to generate an approved shift schedule (e.g., shift schedule A (116) or shift schedule B (117)) for distribution to the employees.

From time to time, an employee (102 and/or 103) may request a change (e.g., to be substituted by other employee) in a shift to the approved schedule by submitting a substitute request (118) to the cost based employee scheduler (120). In one or more embodiment of the invention, the schedule revision module (105) is configured to generate a list of available same cost or lower cost employees from the employee availability schedule (112) and send an invitation to each employee on the list to substitute the shift in response to the substitute request (118). In one or more embodiment of the invention, if same cost or lower cost employee is not available from the employee availability schedule (112), the schedule revision module (105) is further configured to generate a list of available employees with least cost impacts from the employee availability schedule (112) for selection by the employer (101) and send an invitation to each employee selected by the employer (101) to substitute the shift in response to the substitute request (118). In one or more embodiment of the invention, if no available employee can be identified from the employee availability schedule (112) or no acceptance is received from the invited employees, the schedule revision module (105) is further configured to identify additional candidates by analyzing the shift schedule (170) to determine when each employee is not assigned to work a particular shift and send an invitation to those employees with not shift schedule conflict with the shift needing to be substituted. In one or more embodiment of the invention, the schedule revision module (105) is configured to revise the approved shift schedule to generate a revised approved shift schedule based on acceptance from any of the invited employees.

Figure 2:
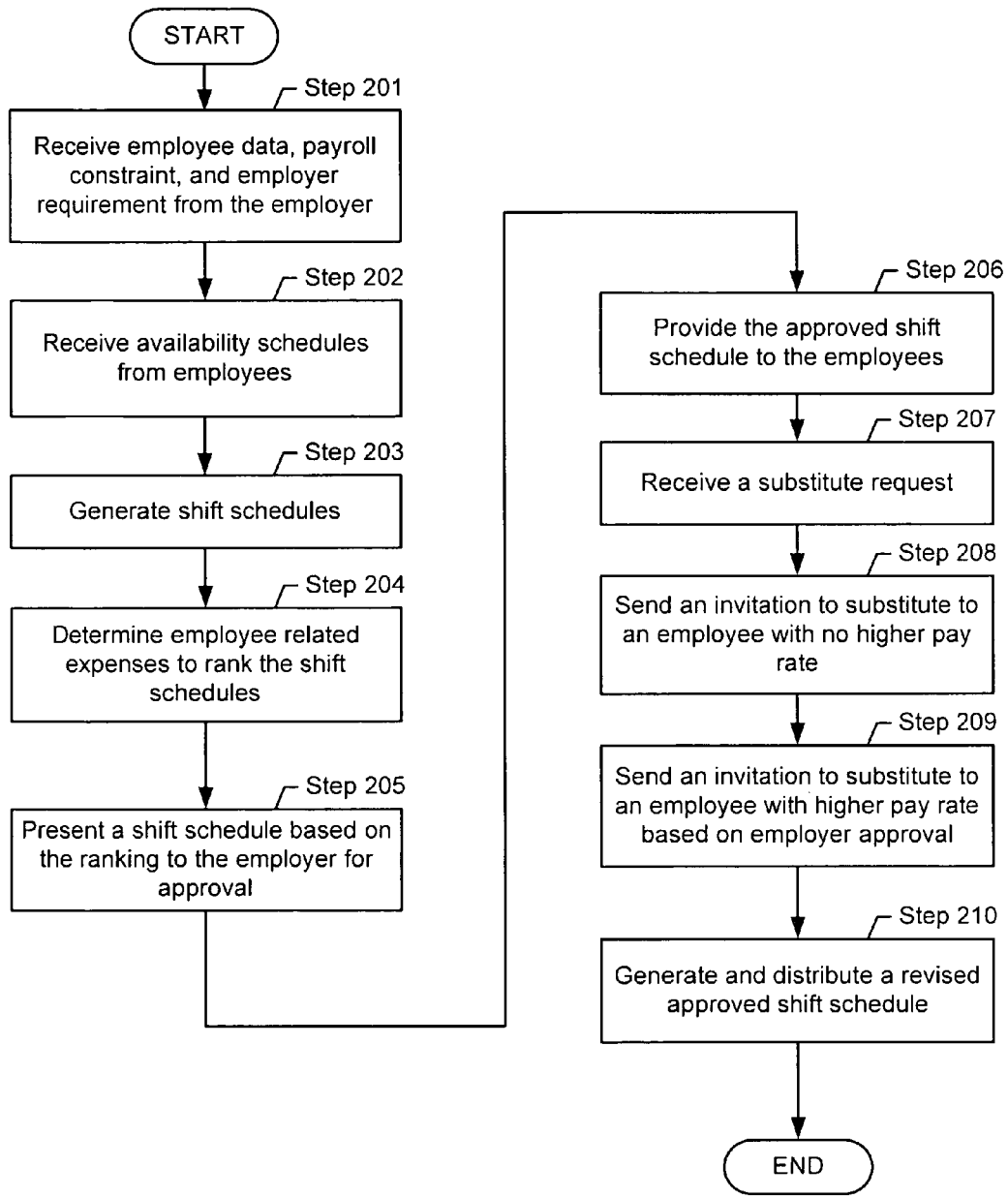
FIG. 2 depicts a flowchart of a method in accordance with one or more embodiments of the invention.

FIG. 2 depicts a flowchart of a method in accordance with one or more embodiments of the invention. In one or more embodiments of the invention, one or more of the steps shown in FIG. 2 may be omitted, repeated, and/or performed in a different order. Accordingly, embodiments of the invention should not be considered limited to the specific arrangements of steps shown in FIG. 2.

In one or more embodiments of the invention, the method depicted in FIG. 2 may be practiced using system (100) described with respect to FIG. 1 above. Initially, employee data, payroll constraint, and employer requirement may be received from the employer (Step 201). These various information may be received all at the same time or separately in batches. From time to time updates to these information may also be received. In one or more embodiments of the invention, these information may be stored in a repository.

In addition, employee availability schedules are received from employees (Step 202). Similar to the information described with respect to Step 201 above, the employee availability schedules may be received all at the same time or separately with updates also received from time to time. In one or more embodiments of the invention, employee availability schedules may be stored in a repository.

Periodically, shift schedules may be generated based on the received employee data, payroll constraint, employer requirement, and employee availability schedules (Step 203). In one or more embodiments of the invention, the shift schedules may be generated based on a pay period, a calendar period, or other periodic basis. In one or more embodiments of the invention, the shift schedule is generated based on a constraint driven algorithm, a cost driven algorithm, an integrated algorithm considering both cost and other constraints, or other suitable algorithm configured in a schedule generation module.

Furthermore, employee related expenses may be determined for ranking corresponding to the shift schedules (Step 204). In one or more embodiments of the invention, the employee related expenses may be a direct cost computed based only on individual pay rate corresponding to each employee assigned to each shift of the shift schedules. In one or more embodiments of the invention, the employee related expenses may be computed including additional indirect expenses (e.g., benefits, overheads, etc.) corresponding to each employee. In one or more embodiments of the invention, the employee related expenses may be computed by a cost driven algorithm of the schedule generation module during the generation of the shift schedules. For example, the employee related expenses may be constrained within a pre-determined limit for the shift schedule to be valid. In one or more embodiments of the invention, the employee related expenses may be computed separately subsequent to the generation of the shift schedules. In one or more embodiments of the invention, the shift schedules may be ranked by comparing or otherwise analyzing the corresponding employee related expenses.

Accordingly, one or more shift schedules may be selectively presented to the employer based on the ranking of the employee related expenses (Step 205). In one or more embodiments of the invention, the top ranked shift schedule (e.g., the shift schedule with the least employee related expense) may be selected and presented to the employer. In one or more embodiments of the invention, a pre-determined number of shift schedules with lowest ranked employee related expense may be selected and presented to the employer.

An approved schedule may be selected or otherwise identified based on the employer review and approval. The approved schedule may then be provided to all employees assigned to work on one or more shifts of the approved shift schedule (Step 206). From time to time, an employee may submit a substitute request to swap an assigned shift (Step 207). For example, the employee availability may have changed or became obsolete due to delay in receiving the update or possible unforeseen circumstances. In one or more embodiments of the invention, an invitation to substitute may be sent to an employee with no higher pay rate or combined direct/indirect total expense rate than the employee to be substituted (Step 208). In one or more embodiments of the invention, an invitation to substitute may be sent to an employee with higher pay rate or combined direct/indirect total expense rate than the employee to be substituted if approved by the employer (Step 209). Subsequently, the originally approved shift schedule may be revised and further approved based on an acceptance to the invitation to substitute (Step 210).

Figure 3:
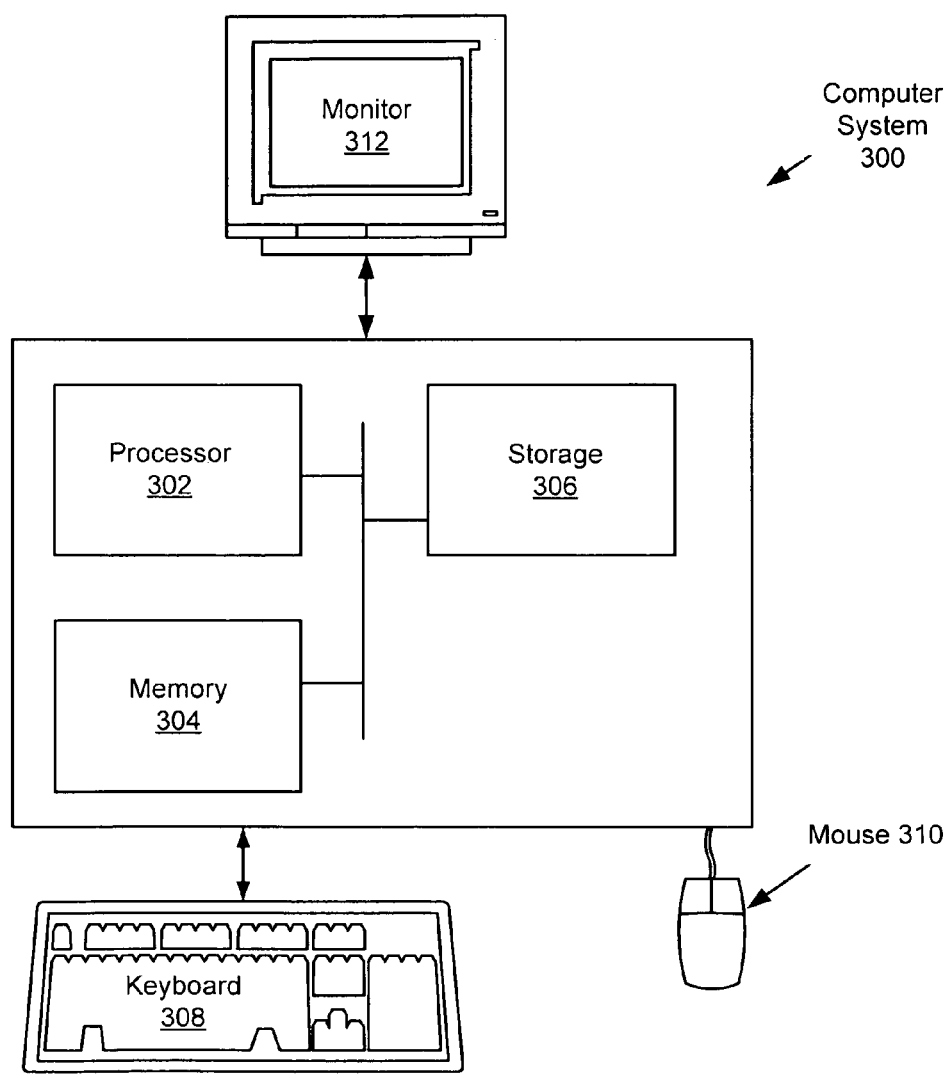
FIG. 3 depicts a computer system in accordance with one or more embodiments of the invention.

Embodiments of the invention may be implemented on virtually any type of computer regardless of the platform being used. For example, as shown in FIG. 3, a computer system (300) includes one or more processor(s) (302), associated memory (304) (e.g., random access memory (RAM), cache memory, flash memory, etc.), a storage device (306) (e.g., a hard disk, an optical drive such as a compact disk drive or digital video disk (DVD) drive, a flash memory stick, etc.), and numerous other elements and functionalities typical of today's computers (not shown). The computer (300) may also include input means, such as a keyboard (308), a mouse (310), or a microphone (not shown). Further, the computer (300) may include output means, such as a monitor (312) (e.g., a liquid crystal display (LCD), a plasma display, or cathode ray tube (CRT) monitor). The computer system (300) may be connected to a network (not shown) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (300) includes at least the minimal processing, input, and/or output means necessary to practice embodiments of the invention.

Further, those skilled in the art will appreciate that one or more elements of the aforementioned computer system (300) may be located at a remote location and connected to the other elements over a network. Further, embodiments of the invention may be implemented on a distributed system having a plurality of nodes, where each portion of the invention (e.g., various modules of FIG. 1A) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing a shift schedule, comprising:
    obtaining employee data for a plurality of part time employees, a payroll constraint for a time period, and an employer requirement for the shift schedule;
    collecting, from the plurality of employees, an employee specific daily time period for each of the plurality of employees to work in one particular day in a particular week;
    generating, by a processor of a computer system, a plurality of daily shift schedules for the one particular day in the particular week based on the payroll constraint, the employee data, the employer requirement, and the employee specific daily time period, wherein the plurality of daily shift schedules comprises a daily shift schedule having a first employee of the plurality of employees assigned to work during the employee specific daily time period of the first employee in the one particular day in the particular week;
    determining, by the processor, a payroll budget associated with each of the plurality of daily shift schedules;
    ranking the plurality of daily shift schedules based on the payroll budget to obtain a ranked list of daily shift schedules;
    presenting the ranked list of daily shift schedules to an employer;
    providing the daily shift schedule to the first employee in response to an approval by the employer based on a ranking of the daily shift schedule in the ranked list;
    receiving a change request to the daily shift schedule from the first employee, wherein the first employee is no longer available to work during the employee specific daily time period of the first employee in the one particular day in the particular week due to an unforeseen event;
    sending, responsive to the change request and automatically without notifying the employer, a substitute request to a second employee of the plurality of employees, wherein the second employee is identified from the plurality of employees based on the employee specific daily time period of the second employee, and wherein the second employee has a pay rate that is same as or lower than the pay rate of the first employee; and
    revising, by the processor, the daily shift schedule to generate a revised daily shift schedule based on the second employee accepting the substitute request.

2. The method of claim 1,
    wherein the employee data comprises at least one selected from a group consisting of pay rate, benefit status, workload constraint, and performance grade of each of the plurality of employees, and
    wherein the employer requirement comprises a shift schedule template, shift length constraint, shift staffing target, and average workload constraint.

3. The method of claim 1, wherein the plurality of daily shift schedules is generated using a constraint driven algorithm based on the payroll constraint.

4. The method of claim 1, wherein the plurality of daily shift schedules is generated using a cost driven algorithm to minimize the payroll budget.

5. The method of claim 1, further comprising:
    further identifying the second employee by analyzing the plurality of daily shift schedules if no employee is identified from the employee specific daily time period to accept the substitute request.

6. The method of claim 1, further comprising:
    requesting approval of the revised daily shift schedule by the employer; and
    presenting the revised daily shift schedule to the plurality of employees based on the approval.

7. The method of claim 6, further comprising:
    further identifying the second employee by analyzing the plurality of daily shift schedules if no employee is identified from the employee specific daily time period to accept the substitute request.

8. A non-transitory computer readable medium storing a plurality of instructions for managing a shift schedule, the plurality of instructions comprising functionality for:
    obtaining employee data for a plurality of part time employees, a payroll constraint for a time period, and an employer requirement for the shift schedule;
    collecting, from the plurality of employees, an employee specific daily time period for each of the plurality of employees to work in one particular day in a particular week;
    generating a plurality of daily shift schedules for the one particular day in the particular week based on the payroll constraint, the employee data, the employer requirement, and the employee specific daily time period, wherein the plurality of daily shift schedules comprises a daily shift schedule having a first employee of the plurality of employees assigned to work during the employee specific daily time period of the first employee in the one particular day in the particular week;

determining a payroll budget associated with each of the plurality of daily shift schedules;

ranking the plurality of daily shift schedules based on the payroll budget to obtain a ranked list of daily shift schedules;

presenting the ranked list of daily shift schedules to an employer;

providing the daily shift schedule to the first employee in response to an approval by the employer based on a ranking of the daily shift schedule in the ranked list;

receiving a change request to the daily shift schedule from the first employee, wherein the first employee is no longer available to work during the employee specific daily time period of the first employee in the one particular day in the particular week due to an unforeseen event;

sending, responsive to the change request and automatically without notifying the employer, a substitute request to a second employee of the plurality of employees, wherein the second employee is identified from the plurality of employees based on the employee specific daily time period of the second employee, and wherein the second employee has a pay rate that is same as or lower than the pay rate of the first employee; and revising the daily shift schedule to generate a revised daily shift schedule based on the second employee accepting the substitute request.

9. The non-transitory computer readable medium of claim 8,
wherein the employee data comprises at least one selected from a group consisting of pay rate, benefit status, workload constraint, and performance grade of each of the plurality of employees, and
wherein the employer requirement comprises a shift schedule template, shift length constraint, shift staffing target, and average workload constraint.

10. The non-transitory computer readable medium of claim 8, wherein the plurality of daily shift schedules is generated using a constraint driven algorithm based on the payroll constraint.

11. The non-transitory computer readable medium of claim 8, wherein the plurality of daily shift schedules is generated using a cost driven algorithm to minimize the payroll budget.

12. The non-transitory computer readable medium of claim 8, the instruction further comprising functionality for:
further identifying the second employee by analyzing the plurality of daily shift schedules if no employee is identified from the employee specific daily time period to accept the substitute request.

13. The non-transitory computer readable medium of claim 8, the instruction further comprising functionality for:
requesting approval of the revised daily shift schedule by the employer; and
presenting the revised daily shift schedule to the plurality of employees based on the approval.

14. The non-transitory computer readable medium of claim 13, the instruction further comprising functionality for:
further identifying the second employee by analyzing the plurality of daily shift schedules if no employee is identified from the employee specific daily time period to accept the substitute request.

15. A system for managing a shift schedule, comprising:
a processor; and
a memory comprising a plurality of instructions executed by the processor, wherein the plurality of instructions are configured to:
obtain employee data for a plurality of part time employees, a payroll constraint for a time period, and an employer requirement for the shift schedule;
collect, from the plurality of employees, an employee specific daily time period for each of the plurality of employees to work in one particular day in a particular week;
generate a plurality of daily shift schedules for the one particular day in the particular week based on the payroll constraint, the employee data, the employer requirement, and the employee specific daily time period, wherein the plurality of daily shift schedules comprises a daily shift schedule having a first employee of the plurality of employees assigned to work during the employee specific daily time period of the first employee in the one particular day in the particular week;
determine a payroll budget associated with each of the plurality of daily shift schedules;
rank the plurality of daily shift schedules based on the payroll budget to obtain a ranked list of daily shift schedules;
present the ranked list of daily shift schedules to an employer;
provide the daily shift schedule to the first employee in response to an approval by the employer based on a ranking of the daily shift schedule in the ranked list;
receive a change request to the daily shift schedule from a first employee of the plurality of employees;
send, responsive to the change request and automatically without notifying the employer, a substitute request to a second employee of the plurality of employees, wherein the second employee is identified from the plurality of employees based on the employee specific daily time period of the second employee, and wherein the second employee has a pay rate that is same as or lower than the pay rate of the first employee; and
revise the daily shift schedule to generate a revised daily shift schedule based on the second employee accepting the substitute request.

16. The system of claim 15,
wherein the employee data comprises at least one selected from a group consisting of pay rate, benefit status, workload constraint, and performance grade of each of the plurality of employees, and
wherein the employer requirement comprises a shift schedule template, shift length constraint, shift staffing target, and average workload constraint.

17. The system of claim 15, wherein the plurality of daily shift schedules is generated using a constraint driven algorithm based on the payroll constraint.

18. The system of claim 15, wherein the plurality of daily shift schedules is generated using a cost driven algorithm to minimize the payroll budget.

19. The system of claim 15, wherein the plurality of instructions are further configured to:
further identify the second employee by analyzing the plurality of daily shift schedules if no employee is identified from the employee specific daily time period to accept the substitute request.

20. The system of claim 15, wherein the plurality of instructions are further configured to:
- request approval of the revised daily shift schedule by the employer; and
- present the revised daily shift schedule to the plurality of employees based on the approval.

21. The system of claim 20, wherein the plurality of instructions are further configured to:
- further identify the second employee by analyzing the plurality of daily shift schedules if no employee is identified from the employee specific daily time period to accept the substitute request.

\* \* \* \* \*